Dec. 19, 1933.  B. T. BROOKS  1,940,073
ART OF SULPHATING OLEFINES
Filed Feb. 5, 1930
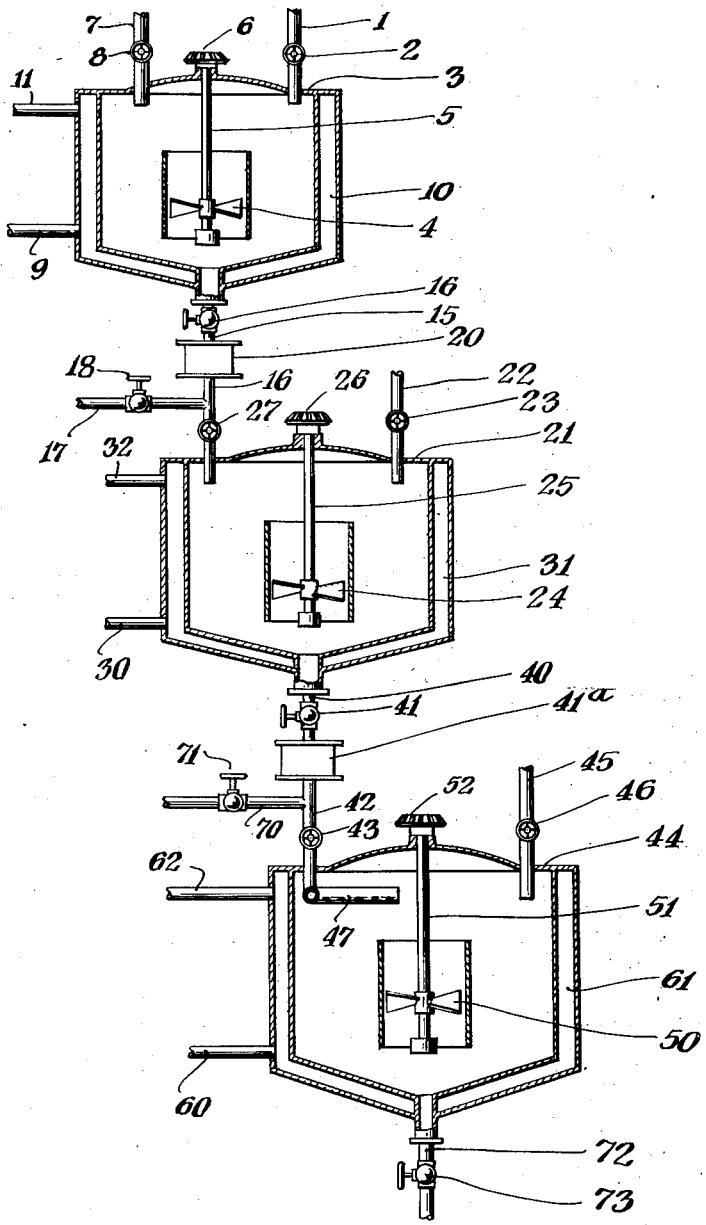
Inventor
Benjamin T. Brooks
By his Attorney
Louis Burgess Patented Dec. 19, 1933

1,940,073

UNITED STATES PATENT OFFICE 1,940,073

ART OF SULPHATING OLEFINES

Benjamin T. Brooks, Stamford, Conn., assignor, by mesne assignments, to Standard Alcohol Company, Wilmington, Del., a corporation of Delaware Application February 5, 1930. Serial No. 426,009

13 Claims. (Cl. 260—98)

This invention relates to the art of sulphating olefines in liquid phase, particularly where such olefines occur in materials consisting predominantly of olefines, and/or in olefines or mixtures of olefines, substantially free from other materials. Such mixtures of olefines are preferably obtained from the normally gaseous constituents resulting from vapor phase cracking of petroleum oils carried out, for example, at temperatures between 1000 and 1200° F. My process is applicable to olefines from propylene to the amylenes both inclusive, although olefines of higher molecular weight may be profitably treated. Where such olefines occur in mixtures of the various olefines mentioned such as, for example, result from vapor phase cracking, they are preferably separated into groups consisting predominantly of olefines of the same number of carbon atoms to the molecule.

I have found that certain distinct advantages result from a process of sulphating olefines in liquid phase, which comprises forming a body of sulphuric acid of the requisite acid concentration and then adding the olefine to be sulphated in liquid phase to the said body of sulphuric acid in quantities insufficient to combine with all the sulphuric acid present. This addition is preferably made in relatively small quantities with vigorous agitation so that the olefine undergoes rapid reaction with the acid.

I may, pursuant to my invention, form a body of liquid sulphuric acid and admix therewith olefine material in liquid phase until the quantity of olefine admixed is sufficient to substantially combine with all the sulphuric acid with the formation of mono-alkyl sulphates; then add an additional quantity of sulphuric acid, and repeat the admixture of relatively small quantities of olefine until the admixed olefine is sufficient to combine with substantially all of the original and added sulphuric acid; but in my preferred procedure the sulphuric acid for a given batch is first charged and olefine in quantity sufficient to combine with this sulphuric acid is then gradually added, while the liquids are subjected to vigorous agitation and mixing for the purpose of causing rapid reaction. The liquid acid and olefine should be held during this period at a temperature at which reaction between liquid sulphuric acid and liquid olefine normally takes place, and the heat of the reaction should be absorbed by the use of cooling means at such a rate as to prevent the attainment of temperatures so high as to be objectionable. By the expression "relatively small quantities" as herein employed, I denote either small separate quantities and/or a continuous stream of added material.

It will of course be understood that the acid strength must be selected in view of the particular olefine or olefines to be treated. Generally speaking, the olefines of higher molecular weight require sulphuric acid of less $H_2SO_4$ content than those of lower molecular weight. For this same reason it is preferable to separate the olefines into groups consisting principally of olefines of the same number of carbon atoms to the molecule so that the strength of sulphuric acid to be applied may be that which gives optimum reaction with the particular olefine. Where this is not done, the acid strength must necessarily be a compromise and may react sluggishly with olefines of lower molecular weight and/or cause polymerization of olefines of higher molecular weight.

In a mixing tank provided with a paddle mixer or propeller and a cooling coil the amount of acid added during the period of a minute, for example, is relatively small compared to the total quantity of olefine present. Greater speeds may be attained in apparatus having more efficient mixing and cooling facilities. It is only necessary that the reacting materials be in liquid phase, that the sulphuric acid be in excess up to approximately the end of the reaction period, and that the temperature, and acid strength are appropriate to the particular olefine. Preferably the rate of mixing is so adjusted that at any given time at least one fourth of the normal olefine theretofore added has been combined with the acid. Given these conditions, the reaction period may be made relatively short without departing from my invention, and the conditions which I have disclosed facilitate this result by permitting the heat of the reaction to be more rapidly abstracted than was heretofore possible.

Liquid phase sulphation of olefines as heretofore carried out in which the olefine is first charged and the sulphuric acid is thereafter added, either in a small stream or in small quantities, has at times been found rather difficult of temperature control. This may, for example, be due to the initiation of certain reactions which are self catalyzing and/or which are exothermic and accelerated by increase of temperature. In any event, I find that the temperature may be much more easily controlled by the process which I have invented. I have found that certain other advantages result with the process which I have invented, including an increase in acid efficiency and a minimization of the amount of olefine material which is lost to the sulphation reaction as a result of polymerization and undesirable reactions including the formation of dialkyl sulphates.

I may, for example, apply my process to the manufacture of isopropyl alcohol. For this purpose, I form a body or pool of sulphuric acid preferably containing from 75 to 80% $H_2SO_4$ content, and gradually admix with the pool of sulphuric acid either pure propylene or a hydrocarbon mixture containing propylene. The preferred raw material for this purpose is a cut consisting predominantly of olefines of 3 carbon atoms to the molecule separated from the cracked gases resulting from vapor phase cracking of petroleum oils. This raw material in liquid phase is gradually admixed with the pool of sulphuric acid. The temperature during the mixing is preferably held by suitable cooling means within the range of 55 to 95° F. and preferably within the range of 65 to 75° F. At the expiration of the treatment, the alkyl sulphate generated may be worked up for isopropyl alcohol or other derivatives of propylene in any suitable manner. The pressure during the process will be that with which the reacting materials are in equilibrium at the particular temperature maintained.

The drawing is a diagrammatic vertical section through apparatus in which my invention may be carried into effect, and this apparatus will be jointly described together with a specific method of carrying out my invention on a particular raw material. In order to generate this raw material, I may take cracked petroleum material such as the normally gaseous constituents of highly cracked petroleum and separate therefrom a fraction consisting predominantly of compounds containing 4 atoms to the molecule. Such a cut is preferably obtained from the normally gaseous constituents resulting from vapor phase cracking of petroleum oils carired out, for example, at temperatures between 1000 and 1200° F. Such a cut may, for example, contain isobutene, butene 1, and erythrene. An example of such a raw material contains approximately the following percentages of the constituents enumerated:

|  | Per cent |
|---|---|
| Erythrene | 15–20 |
| Isobutene | 15–30 |
| Normal butene | 45–65 |

A quantity of this raw material is charged through pipe 1, controlled by valve 2, to autoclave 3. The mixing device consisting of propeller 4, carried by shaft 5, actuated by bevel gear 6, is then set in operation and there is gradually added to the hydrocarbon material through pipe 7, controlled by valve 8, a quantity of aqueous sulphuric acid of an acid concentration between 60 and 70% and preferably between 62 and 66%. The temperature during this operation should be kept comparatively low say between 60 and 65° F. by the introduction of a cooling medium, e. g. liquid ammonia, or sulphur dioxid, through pipe 9 to jacket 10, surrounding autoclave 3. The vaporized refrigerant may return through pipe 11. By carrying out the reaction within the range of temperature and acid concentration mentioned, it may be caused to react selectively with isobutene. The amount of acid to be added at this stage may be determined either by preliminary experiments or by an analysis to establish the isobutene content of the material treated. With a raw material within the range specified, I have obtained good results with approximately 25% by volume of 63% sulphuric acid. The acid and hydrocarbon are vigorously mixed for a period of one or two hours and then settled for a period of two hours or longer during which stratification takes place. At the end of this time the lower layer consisting of acid liquor containing tertiary butyl sulphate may be withdrawn through pipe 15, controlled by valve 16, and diverted from the system through pipe 17, controlled by valve 18, to be worked up for tertiary butyl alcohol. When observation at look-box 20 indicate that the acid liquor has been substantially withdrawn, valves 16 and 18 are closed and a quantity of sulphuric acid is charged to autoclave 21 through pipe 22, controlled by valve 23. The quantity of acid for any given batch may be determined by preliminary experiments or from an analysis of the raw material to be treated. The sulphuric acid to be applied at this stage preferably has a concentration between 70 and 80%, and I find that with the raw material just described good results are obtained by the use of 72% sulphuric acid equivalent to one half of the volume of the hydrocarbon material originally charged to autoclave 3. When the supply of sulphuric acid to autoclave 21 has been completed, valve 23 is closed. The agitating device in autoclave 21, consisting of propeller 24, carried by shaft 25, connected to bevel gear 26, is then set in rotation; thereby vigorously mixing the contents of autoclave 21, valves 16 and 27 are then opened very slightly to discharge a relatively small stream of the olefine material from autoclave 3 into autoclave 21. During this treatment refrigerant is introduced through pipe 30 to jacket 31, surrounding autoclave 21, vaporized refrigerant returning through pipe 32. The quantity of refrigerant is preferably regulated to hold the temperature of the material in autoclave 4 between 70 and 80° F., a temperature of 70 to 75° being preferred.

The rate at which the olefine material may be admitted is to an extent, at least, a function of the rapidity of mixing and efficiency of heat abstration by the refrigerant. The olefine must not be admitted at such a rate as to cause attainment of unduly high temperatures nor to cause the formation of a large quantity of unreacted olefine material. With adequate mixing devices and a sufficiently efficient cooling system, the reaction may be completed in a period of from fifteen minutes to one half hour. Good results are obtained by admitting the olefine in a relatively continuous stream for a period of one hour. It will be observed that in either case the amount of olefine admitted during a period of one minute is relatively small compared to the quantity of sulphuric acid taken; and that up to the extreme end of the reaction there is present in the aggregate liquid phases being admixed an excess of sulphuric acid over that necessary to combine with the olefine present with the formation of mono-alkyl sulphates.

As previously stated, the reaction time may be speeded up with more efficient mixing devices and provision for more rapid cooling, provided only that the temperature of the reacting materials is not permitted to become excessive and the rate of reaction is sufficient to insure that a substantial part of the added olefine is caused to react with the sulphuric acid. Generally speaking, the rate of reaction should be sufficient to insure that at least one fourth of the aggregate normal olefine added at any selected time has been combined with the sulphuric acid.

At the conclusion of the operation, the mixture of acid liquor and/or hydrocarbon in autoclave 21 may be withdrawn through pipe 40, controlled by valve 41, and discharged through pipe 42, controlled by valve 43, to autoclave 44. This autoclave in this case will have been preliminarily charged through pipe 45, controlled by valve 46, with a quantity of water equivalent, for example, to twice the volume of the 72% acid originally taken. The acid reaction mixture is dispersed into autoclave 44, through distributor 47, and during this period the water in 44 is kept in vigorous agitation through the use of agitating device comprising propeller 50, carried by shaft 51, actuated by bevel gear 52. The temperature of the material in autoclave 44 is also held relatively low, preferably below 60° F., by the admission of a refrigerant through pipe 60, to jacket 61, vaporized refrigerant returning through pipe 62. At the conclusion of the dilution operation the material in autoclave 44 may be settled to separate hydrocarbon material from the diluted acid liquor, and this may be separately withdrawn through pipe 72, controlled by valve 73, for conversion into useful products, for example, for the production of secondary butyl alcohol from the diluted acid liquor. If desired, instead of withdrawing the entire reaction mixture from autoclave 21, it may be settled for a period until all or part of the acid liquor in 21 has separated from associated hydrocarbon material, all of the acid liquor may be diverted through the system by pipe 70, controlled by valve 71 for utilization in other ways, or a part only may be abstracted leaving the balance to be diluted in autoclave 44 as hereinbefore described. If desired, the separation in autoclave 21 may be carried to such a point that substantially pure hydrocarbon material is separated from acid liquor, and after the acid liquor has been fed into autoclave 44 as shown by look-box 41ª, the hydrocarbon material remaining in 21 may be taken off through side outlet 70. Ordinarily, however, I do not permit the material in autoclave 21 to settle until this degree of separation has been attained; but discharge a mixture of acid liquor and hydrocarbon material herein designated as an acid reaction mixture into autoclave 44. Owing to the reduction in viscosity in the acid liquor produced by dilution, I find it more expedient to separate the hydrocarbon material, if any, after dilution.

While I have described the invention with reference to a particular raw material, it is not so limited in practical application, but is applicable to the liquid phase treatment of all olefine materials consisting predominantly of olefines, and preferably consisting predominantly of olefines of a single definite number of carbon atoms to the molecule. My process is of particular value, as applied such olefine material containing both normal and diolefines. Inasmuch as the invention is susceptible of being carried out by a variety of methods other than the one particularly described, it is my intention that the invention be limited only by the appended claims or their equivalents in which I have endeavored to claim broadly all inherent novelty.

I claim:

1. Process of sulphating olefines, which comprises reacting an initial quantity of aqueous sulphuric acid with a liquid olefine under conditions of acid concentration and temperature adapted to effect sulphation, and adding the olefine gradually in small amounts to the sulphuric acid while mixing the liquid sulphuric acid and added liquid olefine under said conditions.

2. Process of sulphating olefines, which comprises reacting an initial quantity of sulphuric acid with a liquid olefine under conditions of acid concentration and temperatures adapted to effect sulphation, adding the liquid olefine continuously to the aqueous sulphuric acid while mixing the said sulphuric acid and liquid olefine under said conditions, and while maintaining the ratio of sulphuric acid to olefine in the materials being mixed in excess of that required to form mono alkyl sulphate with the olefine present.

3. Process of sulphating olefines, which comprises reacting an initial quantity of aqueous sulphuric acid with a liquid olefine under conditions of acid concentration and temperatures adapted to effect sulphation, adding the liquid olefine continuously to said aqueous sulphuric acid while mixing the said sulphuric acid and added liquid olefine under said conditions, and maintaining the ratio of sulphuric acid to olefine in the materials being mixed in excess of that required to form mono alkyl sulphate with the olefine present, the rate of addition of the liquid olefine being such that a period of at least 15 minutes is required to complete the addition of olefine up to the amount necessary to form alkyl sulphate with the total sulphuric acid present.

4. Process of sulphating propylene, which comprises reacting an initial quantity of aqueous sulphuric acid with liquid propylene under conditions of acid concentration and temperature adapted to effect sulphation, and adding the liquid propylene gradually in small amounts to the sulphuric acid while mixing the said sulphuric acid and added propylene under said conditions.

5. Process of sulphating propylene, which comprises reacting an initial quantity of aqueous sulphuric acid with liquid propylene under conditions of acid concentration and temperatures adapted to effect sulphation, adding the liquid propylene continuously to said aqueous sulphuric acid while mixing the said sulphuric acid and added propylene under said conditions, and while maintaining the ratio of sulphuric acid to olefine in the materials being mixed in excess of that required to form mono alkyl sulphate with the propylene present.

6. Process of sulphating propylene, which comprises reacting an initial quantity of aqueous sulphuric acid with liquid propylene under conditions of acid concentration and temperatures adapted to effect sulphation, adding the liquid propylene continuously to said aqueous sulphuric acid while mixing said sulphuric acid and added liquid propylene under said conditions, and maintaining the ratio of sulphuric acid to olefine in the materials being mixed in excess of that required to form mono alkyl sulphate with the propylene present, the rate of addition being such that a period of at least 15 minutes is required to complete the addition of olefine up to the amount necessary to form mono alkyl sulphate with the total sulphuric acid present.

7. Process of sulphating butylene, which comprises reacting an initial quantity of aqueous sulphuric acid with liquid butylene under conditions of acid concentration and temperature adapted to effect sulphation, and adding the liquid butylene gradually in small amounts to the sulphuric acid while mixing the said sulphuric acid and added butylene under said conditions.

8. Process of sulphating butylene, which comprises reacting an initial quantity of aqueous sulphuric acid with liquid butylene under conditions of acid concentration and temperatures adapted to effect sulphation, adding the liquid butylene continuously to said aqueous sulphuric acid while mixing the said sulphuric acid and added butylene under said conditions, and while maintaining the ratio of sulphuric acid to olefine in the materials being mixed in excess of that required to form mono alkyl sulphate with the propylene present.

9. Process of sulphating butylene, which comprises reacting an initial quantity of aqueous sulphuric acid with liquid butylene under conditions of acid concentration and temperatures adapted to effect sulphation, adding the liquid butylene continuously to said aqueous sulphuric acid while mixing said sulphuric acid and added liquid butylene under said conditions, and maintaining the ratio of sulphuric acid to olefine in the material being mixed in excess of that required to form mono alkyl sulphate with the butylene present, the rate of addition being such that a period of at least 15 minutes is required to complete the addition of olefine up to the amount necessary to form mono alkyl sulphate with the total sulphuric acid present.

10. Process of sulphating amylene, which comprises reacting an initial quantity of aqueous sulphuric acid with liquid amylene under conditions of acid concentration and temperature adapted to effect sulphation, and adding the liquid amylene gradually in small amounts to the sulphuric acid while mixing the said sulphuric acid and added amylene under said conditions.

11. Process of sulphating amylene, which comprises reacting an initial quantity of aqueous sulphuric acid with liquid amylene under conditions of acid concentration and temperatures adapted to effect sulphation, adding the liquid amylene continuously to said aqueous sulphuric acid while mixing the said sulphuric acid and added amylene under said conditions, and while maintaining the ratio of sulphuric acid to olefine in the materials being mixed in excess of that required to form mono alkyl sulphate with the amylene present.

12. Process of sulphating amylene, which comprises reacting an initial quantity of aqueous sulphuric acid with liquid amylene under conditions of acid concentration and temperatures adapted to effect sulphation, adding the liquid amylene continuously to said aqueous sulphuric acid while mixing said sulphuric acid and added liquid amylene under said conditions, and maintaining the ratio of sulphuric acid to olefine in the materials being mixed in excess of that required to form mono alkyl sulphate with the amylene present, the rate of addition being such that a period of at least 15 minutes is required to complete the addition of olefine up to the amount necessary to form mono alkyl sulphate with the total sulphuric acid present.

13. Process of treating olefine material consisting predominantly of isobutene, butene 1 and erythrene, which comprises selectively removing isobutene from said olefine material, and thereafter sulphating butene 1 contained in said olefine material by treating an initial quantity of liquid aqueous sulphuric acid with said olefine material, adding the said olefine material in liquid form continuously to said liquid aqueous sulphuric acid while mixing said sulphuric acid and added liquid olefine material, maintaining the ratio of sulphuric acid to olefine in the materials being mixed in excess of that required to form mono alkyl sulphate with the olefine present, the rate of addition being such that a period of at least 15 minutes is required to complete the addition of olefine material up to the amount necessary to form mono alkyl sulphate with the sulphuric acid present.

BENJAMIN T. BROOKS.